(12) United States Patent
Breault et al.

(10) Patent No.: US 8,492,038 B2
(45) Date of Patent: Jul. 23, 2013

(54) STARTUP AND SHUTDOWN PROCEDURES FOR OPERATING A FUEL CELL ASSEMBLY

(75) Inventors: Richard D. Breault, North Kingstown, RI (US); Carl Rohrbach, Jr., Somers, CT (US)

(73) Assignee: ClearEdge Power Corporation, South Windsor, CT (US)

( * ) Notice: Subject to any disclaimer, the term of this patent is extended or adjusted under 35 U.S.C. 154(b) by 1069 days.

(21) Appl. No.: 11/718,253

(22) PCT Filed: Dec. 29, 2004

(86) PCT No.: PCT/US2004/043613
§ 371 (c)(1),
(2), (4) Date: Apr. 30, 2007

(87) PCT Pub. No.: WO2006/071223
PCT Pub. Date: Jul. 6, 2006

(65) Prior Publication Data
US 2008/0096060 A1    Apr. 24, 2008

(51) Int. Cl.
*H01M 8/04* (2006.01)
(52) U.S. Cl.
USPC .......... 429/429; 429/428; 429/433; 429/434; 429/442
(58) Field of Classification Search
None
See application file for complete search history.

(56) References Cited

U.S. PATENT DOCUMENTS

| | | | |
|---|---|---|---|
| 5,013,617 A | 5/1991 | Scheffler | |
| 5,045,414 A | 9/1991 | Bushnell et al. | |
| 6,519,510 B1 * | 2/2003 | Margiott et al. | 700/299 |
| 6,635,370 B2 | 10/2003 | Condit et al. | |
| 6,660,416 B2 | 12/2003 | Sederquist et al. | |
| 6,858,336 B2 | 2/2005 | Reiser et al. | |
| 7,223,490 B2 | 5/2007 | Hayashi et al. | |
| 2002/0076583 A1 * | 6/2002 | Reiser et al. | 429/13 |
| 2003/0129462 A1 | 7/2003 | Yang et al. | |
| 2008/0003465 A1 * | 1/2008 | Yu et al. | 429/13 |

FOREIGN PATENT DOCUMENTS

| | | |
|---|---|---|
| JP | 5335026 A | 12/1993 |
| JP | 8037014 A | 2/1996 |
| JP | 10-144334 * | 5/1998 |
| JP | 10144334 | 5/1998 |

OTHER PUBLICATIONS

PCT International Search Report for International application No. PCT/US04/43613 mailed May 13, 2005.
PCT Written Opinion of the International Searching Authority for International application No. PCT/US04/43613 mailed May 13, 2005.
Supplementary European Search Report for Application No. EP 04 81 5640, mailed Apr. 20, 2010.
PCT International Preliminary Report on Patentability mailed Jul. 17, 2007 for International application No. PCT/US2004/043613.

* cited by examiner

*Primary Examiner* — Barbara Gilliam
*Assistant Examiner* — Angela Martin
(74) *Attorney, Agent, or Firm* — Carlson, Gaskey & Olds PC

(57) ABSTRACT

A fuel cell assembly (20) has an extended operational life, in part, because of unique startup and shutdown procedures used for operating the fuel cell assembly. In disclosed examples, a purge gas mixture of hydrogen and nitrogen includes less than 2% hydrogen for selectively purging portions of the assembly during a startup or shutdown procedure. In a disclosed example, the hydrogen-nitrogen mixture contains less than 0.1% hydrogen.

10 Claims, 1 Drawing Sheet

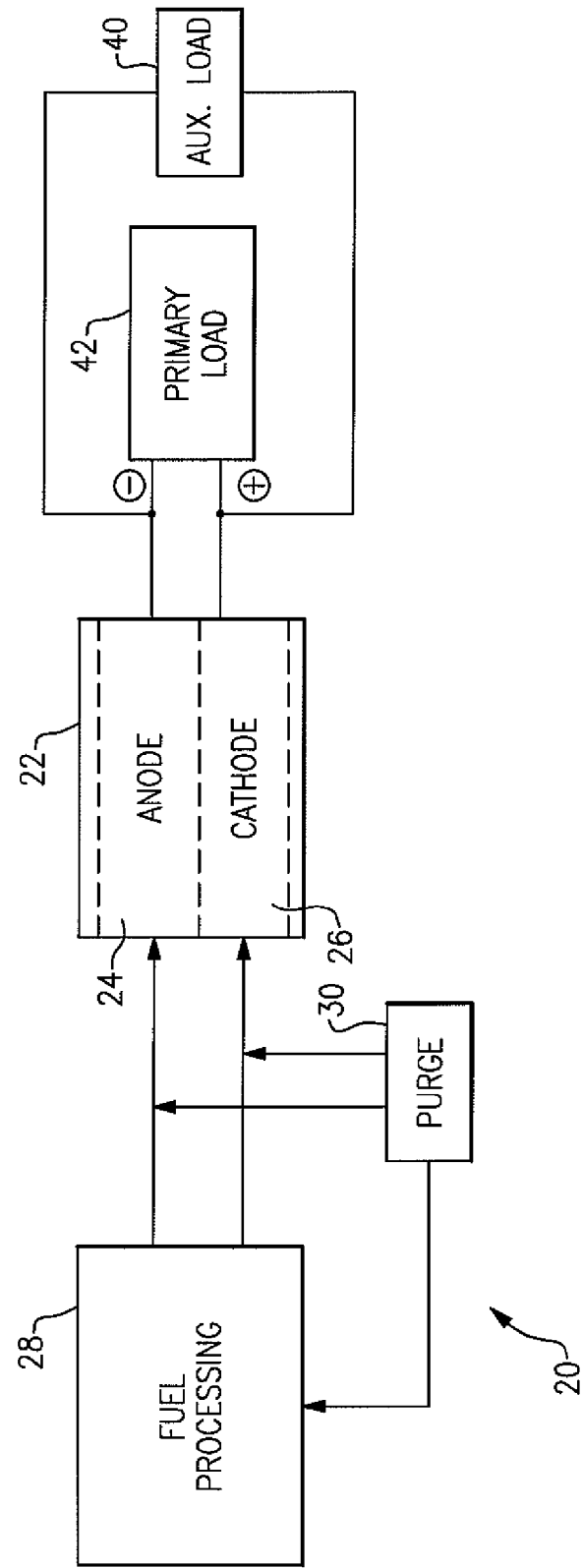

STARTUP AND SHUTDOWN PROCEDURES FOR OPERATING A FUEL CELL ASSEMBLY

FIELD OF THE INVENTION

This invention generally relates to fuel cells. More particularly, this invention relates to techniques for starting up and shutting down a fuel cell assembly to achieve an extended operational life.

DESCRIPTION OF THE RELATED ART

Fuel cells are well known. Typical arrangements include a fuel processing portion and a fuel cell stack or fuel cell portion. Fuel cell assemblies operate in a known manner to generate electrical power.

One challenge faced by designers of fuel cell assemblies is achieving a long operational life in an economical manner. A number of factors affect the useful life of a fuel cell assembly. For example, the manner in which a fuel cell assembly is shutdown from an operating state and placed into a storage state has an impact on the performance decay experienced over the life of the cell assembly. More particularly, oxidation of the carbonaceous catalyst support resulting from the combined effects of temperature and electrochemical potential causes performance loss at a rate that depends, at least in part, on the procedures used for shutting down the fuel cell assembly.

Various techniques have been proposed in an attempt to extend the useful life of a fuel cell assembly. U.S. Pat. No. 5,045,414, for example, discloses using an oxygen-nitrogen gas as a purge gas for a cathode side of a phosphoric acid fuel cell during a shutdown procedure. That patent also teaches using an auxiliary electrical load to lower cathode potential. U.S. Pat. No. 6,519,510 discloses cooling a fuel cell from an operational temperature to a transition temperature with the fuel cell portion operating at an idle load before initiate purging procedures. U.S. Pat. No. 6,635,370 discloses a shutdown and startup procedure that includes selectively controlling airflow and reducing cell voltage in a manner that is intended to extend fuel cell life.

Those skilled in the art are always striving to make improvements. This invention provides unique shutdown and startup procedures that provides superior results for extending the useful life of a fuel cell assembly.

SUMMARY OF THE INVENTION

An example startup procedure for operating a fuel cell assembly includes heating at least the fuel cell portion and the fuel processing portion of the assembly to bring the heated portions to a selected operational temperature. While heating those portions to the operational temperature, anode and cathode flow fields of the fuel cell portion are periodically purged with a hydrogen-nitrogen mixture that has less than about 2% hydrogen. In one example, the mixture has less than about 0.1% hydrogen.

When a temperature of at least the fuel processing portion corresponds to the selected operational temperature, a flow of reactants to the fuel processing portion begins. A flow of hydrogen rich fuel to the anode flow field begins when a temperature of at least the fuel cell portion corresponds to the selected operational temperature. Any auxiliary electrical load coupled to the fuel cell portion is disabled.

Air flow to the cathode flow field is then initiated and the fuel cell portion is connected to a primary electrical load that is at least idle.

An example shutdown procedure for operating a fuel cell assembly includes reducing an average temperature of the fuel cell portion from an operational temperature to a selected reduced temperature when the fuel cell portion is coupled to an idle load. Once the selected temperature is reached, the primary electrical load is disconnected from the fuel cell portion. Simultaneously terminating air flow to a cathode flow field of the fuel cell portion and connecting an auxiliary electrical load to the fuel cell portion reduces a voltage of the fuel cell portion to less than about 0.2 volts per cell.

A flow of a hydrogen-nitrogen mixture having less than about 2% hydrogen begins flowing through the cathode flow field. In one example, a volume of the mixture is used that is at least about three times a void volume of the cathode flow field. A hydrogen rich fuel flow to the fuel cell portion is terminated along with terminating hydrocarbon fuel flow to the fuel processing portion. A hydrogen-nitrogen mixture having less than about 2% hydrogen begins flowing through an anode flow field of the fuel cell portion and the fuel processing portion. In one example, a volume of the mixture is used that is at least about three times a void volume of the anode flow field and the fuel processing portion, respectively.

The fuel cell portion is then cooled to a selected storage temperature. While cooling the fuel cell portion, the cathode flow field, the anode flow field and the fuel processing portion are periodically purged with a hydrogen-nitrogen mixture that has less than about 2% hydrogen.

Once the fuel cell portion has reached the selected storage temperature, the cathode flow field, the anode flow field and the fuel processing portion are periodically purged with a hydrogen-nitrogen mixture that has less than about 2% hydrogen.

In one example, the purging hydrogen-nitrogen mixture used at various stages during the shutdown procedure has less than about 0.1% hydrogen.

The various features and advantages of this invention will become apparent to those skilled in the art from the following detailed description of currently preferred embodiments. The drawing that accompanies the detailed description can be briefly described as follows.

BRIEF DESCRIPTION OF THE DRAWING

FIG. 1 schematically shows selected portions of a fuel cell assembly that can be operated using procedures designed according to an embodiment of this invention.

DETAILED DESCRIPTION OF THE PREFERRED EMBODIMENTS

FIG. 1 schematically shows a fuel cell assembly 20 that includes a fuel cell portion 22. As known, the fuel cell portion 22 includes a fuel cells including an anode 24 and a cathode 26. As known, the anode 24 and cathode 26 each include a catalyst layer and a flow field. A typical fuel cell portion 22 includes a stack of fuel cells such that there are a plurality of anodes and cathodes. In one example, the fuel cell portion 22 comprises a stack of phosphoric acid fuel cells. The fuel cell portion 22 operates in a known manner.

A fuel processing portion 28 operates in a known manner. The fuel processing portion 28 includes known elements such as a hydrodesulfurizer, a steam reformer and a water gas shift reactor. The catalyst in the steam reformer in one example is a base metal such as nickel and the catalyst in the shift reactor is a base metal such as copper. A nickel-containing reformer must be purged with an inert gas during a shutdown procedure to prevent formation of nickel carbonyl for known reasons. A copper-containing shift reactor must be purged with inert gas during a shutdown procedure to prevent oxidation of the copper, which would otherwise reduce its activity.

One example fuel processing portion 28 has a noble metal catalyst in the reformer and the shift reactor. Such noble metal containing components of the fuel processing portion 28 can be exposed to air without deleterious results. It is not necessary to purge these noble metal containing elements with the hydrogen-nitrogen mixture during a starting or shutdown procedure. In such an example, only some of the fuel processing portion will be purged with a hydrogen-nitrogen mixture as described below. Accordingly, discussion of purging a fuel processing portion in this description should be understood to pertain to only such components as would benefit from such purging.

The example fuel cell assembly 20 has an extended operational life, in part, because unique startup and shutdown procedures reduce the performance decay experienced over time, which results in an extended useful life and a reduced cost for electrical power generated by the assembly 20.

An example startup procedure for operating the fuel cell assembly 20 includes heating at least the fuel cell portion 22 and the appropriate portions of the fuel processing portion 28 to bring the heated portions to a selected operational temperature. While heating those portions to the operational temperature, the anode 24 and cathode 26 flow fields are periodically purged with a purge gas from a supply 30.

In one example, the purge gas is a mixture of hydrogen and an inert gas that has less than about 2% hydrogen. In one preferred example, the mixture has less than about 0.1% hydrogen.

A hydrogen-nitrogen mixture is superior to an oxygen-nitrogen mixture as a purge gas. The hydrogen-nitrogen mixture of the disclosed examples yields less performance loss and, therefore, an extended useful life of the assembly 20.

The purge gas used in the described example is a hydrogen-nitrogen mixture. The nitrogen may be replaced by any of the inert gases which are helium, neon, argon, krypton, xenon and radon. The nitrogen also may be replaced by any gas that is inert in the fuel cell environment. One example of such a gas is carbon dioxide.

When a temperature of at least the fuel processing portion 28 corresponds to the selected operational temperature, a flow of reactants to the fuel processing portion 28 begins. A flow of hydrogen rich fuel to the anode 24 flow field begins when a temperature of at least the fuel cell portion 22 corresponds to the selected operational temperature. Any auxiliary electrical load 40 that was coupled to the fuel cell portion is disabled at about this point in the procedure using a known technique. The illustration includes an auxiliary load 40 that operates in a known manner to reduce cell potential during periods of non-use.

Air flow to the cathode 26 flow field is then initiated and a known technique is used to connect the fuel cell portion 22 to a primary electrical load 42 that is at least idle. In some situations, the initial load on the fuel cell portion 22 will be greater than an idle load because of the corresponding condition of the primary load 42.

An example shutdown procedure for operating the fuel cell assembly 20 includes reducing an average temperature of the fuel cell portion 22 from an operational temperature to a selected reduced temperature when the primary load 42 coupled to the fuel cell portion 22 is idle. In one example, the operational temperature is greater than about 350° F. (177° C.) at a load of about 250 ASF and the selected reduced temperature is about 300° F. (150° C.) at a load of about 50 ASF. Once the selected temperature is reached, the primary electrical load 42 is disconnected from the fuel cell portion 22 using known techniques. Simultaneously terminating air flow to the cathode 26 flow field and connecting the auxiliary electrical load 40 to the fuel cell portion 22 reduces a voltage of the fuel cell portion 22. In one example, the reduced voltage is less than about 0.2 volts per cell.

A flow of the hydrogen-nitrogen mixture purge gas begins flowing through the cathode 26 flow field. A hydrogen rich fuel flow to the fuel cell portion 22 is terminated by terminating hydrocarbon fuel flow to the fuel processing portion 28. The hydrogen-nitrogen mixture from the source 30 begins flowing through the anode 24 flow field and the fuel processing portion 28. In one example, a volume of purge gas is used that is at least about three times a void volume of the anode 24 flow field and the fuel processing portion 28, respectively. In one preferred example, the purging hydrogen-nitrogen mixture used during the shutdown procedure has less than about 0.1% hydrogen.

The fuel cell portion 22 is then cooled to a selected storage temperature. In one example, the storage temperature is within a range from about 110° F.-140° F. (43° C.-60° C.). While cooling the fuel cell portion 22, the cathode 26 flow field, the anode 24 flow field and the fuel processing portion 28 are periodically purged with the hydrogen-nitrogen mixture.

Once the fuel cell portion 22 has reached the selected storage temperature, the cathode 26 flow field, the anode 24 flow field and the fuel processing portion 28 are periodically purged with hydrogen-nitrogen mixture in one example.

One unique feature of the example shutdown procedure is that the cathode 26 flow field and the fuel processing portion 28 are purged with the hydrogen-nitrogen mixture. Purging the cathode 26 displaces air or depleted air from the oxidant inlet and exit manifolds, respectively. This results in a more effective passivation of the cathode 26 compared to simply terminating air flow to the cathode 26.

There are potential applications for operating a fuel cell assembly where the fuel is pure hydrogen rather than a reformed hydrocarbon fuel. One source of such hydrogen is by-product hydrogen from the production of chlorine using the known chlor-alkai process. Such a fuel cell assembly would not include a fuel cell processing portion as previously described. In one example, the fuel cell portion of such a fuel cell assembly would still be started up and shutdown as previously described.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of shutting down a fuel cell assembly having a fuel cell portion, comprising the steps of:
   (A) reducing an average temperature of the fuel cell portion from an operational temperature to a selected temperature that is lower than an average operating temperature when the fuel cell portion is coupled to an idle primary electrical load;
   (B) disconnecting the primary electrical load from the fuel cell portion once the selected temperature is reached;
   (C) terminating air flow to the cathode flow field;
   (D) connecting an auxiliary electrical load to the fuel cell portion while performing step (C) to thereby reduce a voltage of the fuel cell portion to less than 0.2 volts/cell;
   (E) providing a flow of a purge gas mixture through the cathode flow field;

(F) terminating hydrogen rich fuel flow to the fuel cell portion;
(G) providing a flow of a purge gas mixture to the anode flow field;
(H) cooling the fuel cell portion to a selected storage temperature; and
(I) periodically purging the cathode flow field and the anode flow field with a purge gas mixture while performing step (H) of the shutdown procedure.

2. The method of claim 1, including periodically purging the cathode flow field and the anode flow field with the purge gas mixture after the fuel cell portion has reached the selected storage temperature.

3. The method of claim 1, wherein the operational temperature of step (A) is at least about 350° F. (177° C.) and the selected reduced temperature is about 300° F. (150° C.).

4. The method of claim 1, wherein the purge gas mixture comprises hydrogen in an amount less than 2%.

5. The method of claim 1, wherein the purge gas mixture comprises a hydrogen-nitrogen mixture having less than about 0.1% hydrogen.

6. The method of claim 1, wherein the selected storage temperature of step (H) is within a range from about 110° F. (43° C.) to about 140° F. (60° C.).

7. The method of claim 1, wherein the fuel cell assembly includes a fuel processing portion and the method includes performing step (F) by terminating hydrocarbon fuel flow to at least a selected component of the fuel processing portion;
providing a flow of a purge gas mixture comprising less than about 2% hydrogen to at least a selected component of the fuel processing portion while performing step (G); and
periodically purging at least a selected component of the fuel processing portion using the purge gas mixture while performing steps (H) and (I).

8. The method of claim 7, including periodically purging at least the selected component of the fuel processing portion, the cathode flow field and the anode flow field with the purge gas mixture after the fuel cell portion has reached the selected storage temperature.

9. The method of claim 1, wherein steps (A) through (H) are performed sequentially.

10. The method of claim 1, wherein step (A) is at least initiated before step (B) is initiated, step (B) is at least initiated before step (C) is initiated, step (C) is at least initiated before step (E) is initiated, step (E) is at least initiated before step (F) is initiated, and step (F) is at least initiated before step (G) is initiated.

* * * * *